April 19, 1927.
A. LOUGHEED
1,625,264
DIFFERENTIAL DRIVE
Filed July 10, 1926
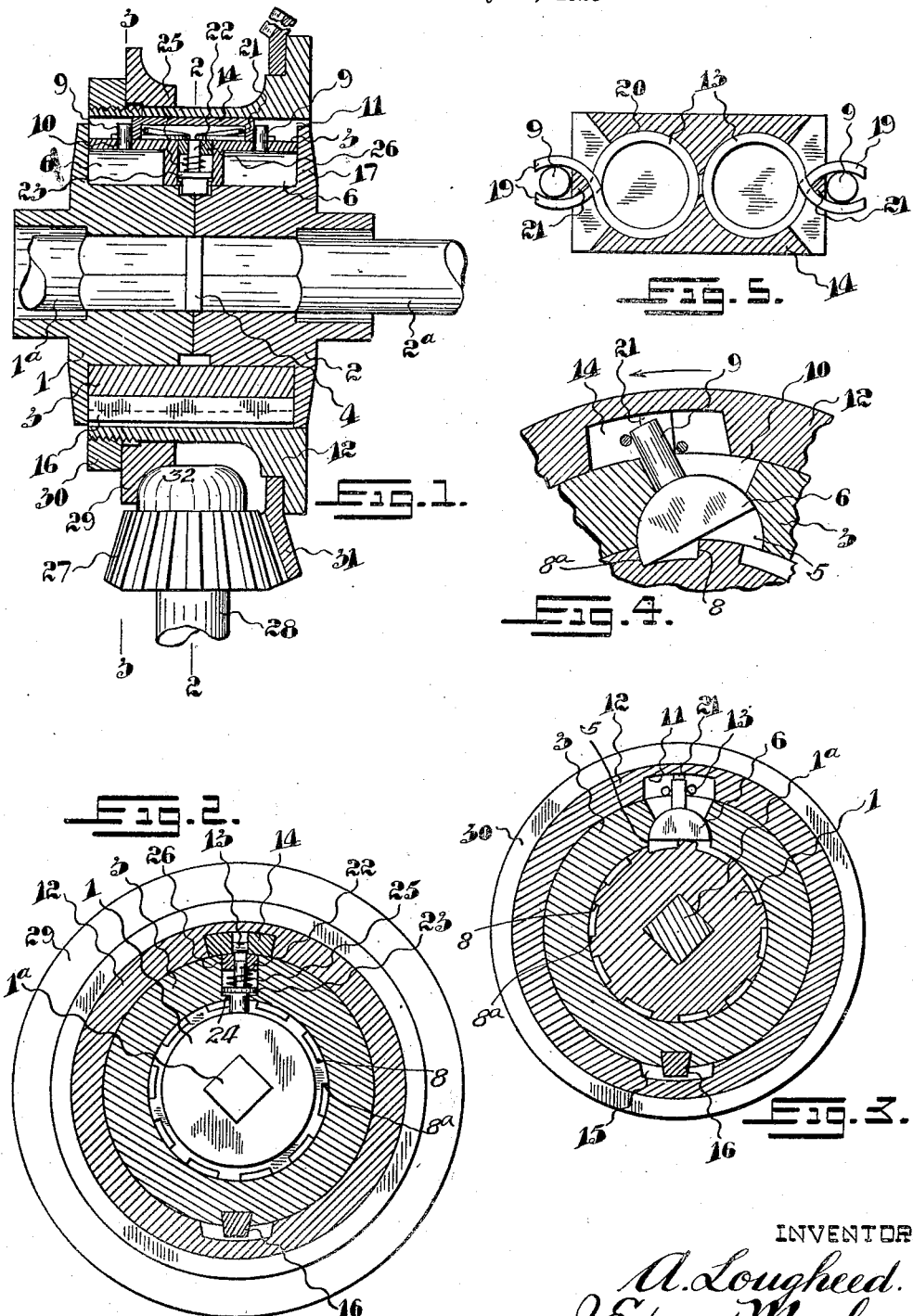
INVENTOR.
A. Lougheed.
BY J. Edward Maybee.
ATTY.

Patented Apr. 19, 1927.

1,625,264

UNITED STATES PATENT OFFICE.

AARON LOUGHEED, OF PORT ARTHUR, ONTARIO, CANADA.

DIFFERENTIAL DRIVE.

Application filed July 10, 1926. Serial No. 121,589.

This invention relates to means for driving two alined rotatable parts so that, when necessary, either one may rotate at a greater speed than the other and is more particularly an improvement on the pawl-and-ratchet described and claimed in my prior United States Patent 1,522,730, dated January 13th, 1925, and Canadian Patent 246,708, dated February 10th, 1925.

My object in the present invention is to provide a differential drive which may be readily fitted to different types of axles, to improve the spring mechanism of the pawls forming the drive connections, and to provide means for ensuring the engagement of the pawls when the driving sleeve is started in motion.

I attain my object and others which will hereinafter appear by means of the constructions hereinafter described and illustrated in the accompanying drawings in which—

Fig. 1 is a longitudinal section of my improved drive;

Fig. 2 a section on the line 2—2 in Fig. 1;

Fig. 3 a section on the line 3—3 in Fig. 1 showing the pawl in neutral position;

Fig. 4 a similar view showing the pawl engaged with one of the shaft hubs; and

Fig. 5 a plan view of the under side of the spring holder showing one spring in position.

In the drawings like numerals of reference indicate corresponding parts in the different figures.

1 and 2 are hubs arranged in axial alinement and adapted to receive the ends of two shafts or axles $1^a$ and $2^a$, these shafts being squared or otherwise shaped so that the hubs have a driving engagement therewith. It is evident that the hubs may be shaped to engage any type of axle end commonly employed for motor vehicles. Between the ends of the shaft a suitable washer 4 is fitted. Fitted over the hubs is an inner sleeve 3. The hubs, it will be noted, are formed with the flanges 17 fitting the ends of the sleeve 3. The sleeve 3 has two segmento-cylindrical recesses 5 formed therein preferably in alinement. In each recess is fitted a segmento-cylindrical pawl 6. The inner side of this pawl is cut away so that when the pawl is in the position shown in Fig. 3, it lies entirely outside of, though contacting the periphery of the adjacent hub. In the adjacent hub are formed a plurality of notches shaped to form a plurality of pairs of oppositely directed shoulders 8 and $8^a$ so positioned that the pawl may be rocked in the recess in the sleeve to bring either one end or the other into engagement with the corresponding shoulder. In Fig. 4 one end is shown thus engaged so that when the sleeve is rotated in the direction of the arrow, the shaft will be driven. The shoulders must, of course be spaced apart a distance not less than the radius of the segmento-cylindrical recess, as otherwise the rocking of the pawl would be interfered with.

Each pawl has an arm 9 formed thereon which extends through a slot 10 in the sleeve 3 into a recess 11 formed in the outer or driving sleeve 12 fitted over the sleeve 3. It is evident that if the arms have an operative connection with the driving sleeve 12 that the pawls may be rocked to engage the ratchet teeth of the hubs whereby the latter may be driven in one direction or the other according to the direction of rotation of the driving sleeve. The connection between each arm and the driving sleeve is a resilient one for a purpose which will hereafter appear.

In the present construction this connection is formed by means of the springs 13, which are fitted in a carrier 14, which is fitted in the recess 11 and engages the opposite sides thereof. Each spring is formed with a single coil and cross ends 19 which embrace one of the arms 9. The carrier is shaped to form the seats 20 for the coils of the springs and a post 21 at each end embraced by the crossed ends 19 of the corresponding spring. From this construction it follows that the arms 9 of the pawls will be maintained in a given position relative to the sleeve. When the driving sleeve is rotated, for example, in the direction indicated by arrow in Fig. 4, the pawls 6 are rocked to engage them with the hubs as shown. Assuming now that one of the shafts runs ahead of the other, as would happen if the shafts $1^a$ and $2^a$ were the axles of a motor vehicle turning a corner, the hub engaged by one of the pawls rides under the pawl and rocks it to neutral position against the tension of the corresponding spring 13. The hub then rotates under the pawl until the next shoulder comes into position for engagement with the pawl. The pawl drops, but is again lifted by the rotation of the hub and the process is repeated as long as the hub continues to rotate faster than the sleeves.

The oppositely directed shoulders arranged in pairs are used to provide for backward as well as forward drive, and a plurality of pairs are preferably employed to provide for a quick picking up of the shaft when the driving sleeve is rotated.

It is not desirable for heavy work that the sole driving connection between the sleeve 12 and the sleeve 3 should be through the medium of the springs 13. I therefore form a longitudinal slot 15 in the outer sleeve into which projects a key 16 formed on or connected to the inner sleeve, the key being narrower than the slot so that before the key engages the side of the slot sufficient relative movement of the two sleeves has taken place to permit of the rocking of the pawls as hereinbefore referred to. The driving sleeve may itself be driven in any desired manner. I show for this purpose the bevel gearing 27, 31.

It is important that when the outer sleeve is driven that it should rotate relative to the inner sleeve before the latter moves relative to the hubs, and for this purpose I provide the plunger 22 fitted in a recess in the inner sleeve and bearing in a groove formed in the ends of the hubs. This plunger is formed with a head 23 adapted to bear against a shoulder 24 formed in the recess in the inner sleeve in which it is positioned. The extension of the plunger is thus limited. A coil spring 25 bears against the head 23 and against a nut 26 fitted over the stem of the plunger screwed in position in the recess in the inner sleeve.

A crown gear wheel 31 is shown secured to the outer sleeve at one end thereof. With it meshes the pinion 27 of a drive shaft 28.

The other end of the outer sleeve has a collar 29 positioned thereon. This is shown as loose on the sleeve and is backed by the lock nut 30.

This collar 29 may be used to back up the gear pinion to hold it properly in mesh with the crown gear. The collar is formed with an annular seat of quarter-round section in its inner side in which engages the end 32 of the drive shaft.

What I claim is:

1. A drive connection comprising a shaft; a hub fitted on the shaft and having a driving connection therewith; an inner sleeve rotatable on the hub and having a recess formed therein adjacent said hub; a double pawl pivoted in said inner sleeve; teeth having oppositely directed shoulders formed in the hub; an outer sleeve rotatable on the inner sleeve and having a recess formed therein adjacent the inner sleeve; an arm on said pawl extending through the inner sleeve into the recess in the outer sleeve; a spring carrier fitted into the recess in the outer sleeve; and a bent spring formed with a loop held in said carrier and ends embracing the arm of the pawl and resiliently tending to retain said arm in a given position relative to the sleeve.

2. A drive connection comprising a shaft; a hub fitted on the shaft and having a driving connection therewith; an inner sleeve rotatable on the hub and having a recess formed therein adjacent said hub; a double pawl pivoted in said inner sleeve; teeth having oppositely directed shoulders formed in the hub; an outer sleeve rotatable on the inner sleeve and having a recess formed therein adjacent the inner sleeve; an arm on said pawl extending through the inner sleeve into the recess in the outer sleeve; a spring connection between the outer sleeve and said arm tending to retain said arm in a given position relative to the sleeve; and a friction device between the inner sleeve and the hub whereby, when the outer sleeve is rotated it will move relative to the inner sleeve before the inner sleeve moves relative to the hub.

3. In a differential drive the combination of two alined rotatable parts; an inner sleeve concentric therewith; two double pawls pivoted in said sleeve, one for each of said rotatable parts; adjacent oppositely directed ratchet teeth formed in each of said parts; a driving sleeve fitted over the first mentioned sleeve having a longitudinal recess formed therein next to said inner sleeve; arms extending from the pawls into said recess; a spring carrier fitted into said recess and formed at opposite ends with a spring seat and a post opposite the seat; and a coil spring at each end of the carrier having its ends crossed to embrace the post and the arm of the adjacent pawl, the coil of the spring being fitted in the seat.

4. In a differential drive the combination of two alined rotatable parts; an inner sleeve concentric therewith; two double pawls pivoted in said sleeve, one for each of said rotatable parts; adjacent oppositely directed ratchet teeth formed in each of said parts; a driving sleeve fitted over the first mentioned sleeve having a longitudinal recess formed therein next to said inner sleeve; arms extending from the pawls into said recess; a spring connection between the outer sleeve and each arm tending to retain the said arm in a given position relative to the sleeve; and a friction device between the inner sleeve and each of the alined rotatable parts whereby, when the outer sleeve is rotated it will move relative to the inner sleeve before the inner sleeve moves relative to the alined rotatable parts.

Signed at Port Arthur this 28th day of June 1926.

AARON LOUGHEED.